United States Patent [19]

Huddleston et al.

[11] Patent Number: 4,797,322
[45] Date of Patent: Jan. 10, 1989

[54] NOVEL ADHESIVES

[75] Inventors: Elwyn Huddleston, Franklin; Karen C. Long, Bowling Green, both of Ky.

[73] Assignee: The Kendall Company, Boston, Mass.

[21] Appl. No.: 126,432

[22] Filed: Nov. 30, 1987

[51] Int. Cl.$^4$ ............................................. B32B 25/08
[52] U.S. Cl. .................................... 428/355; 422/516; 524/484; 525/89
[58] Field of Search .................. 525/89; 524/484; 428/501, 502, 515, 516, 355

[56] References Cited

U.S. PATENT DOCUMENTS

| T100,203 | 1/1981 | Lauck | 525/89 |
| 3,519,585 | 7/1978 | Miller | 525/89 |
| 4,136,071 | 1/1979 | Korpman | 525/89 |

FOREIGN PATENT DOCUMENTS

| 0197774 | 10/1986 | European Pat. Off. | 525/89 |
| 60-223890 | 11/1985 | Japan | 525/89 |
| 2115823 | 9/1983 | United Kingdom | 525/89 |

Primary Examiner—Allan M. Lieberman
Attorney, Agent, or Firm—Alvin Isaacs

[57] ABSTRACT

Novel adhesives comprising an elastomer composition comprising (1) at least 30 percent by weight of a triblock terpolymer elastomer having polystyrene end blocks and rubber poly(ethylene-butylene) midblocks; (2) at least 10 percent by weight of a diblock copolymer elastomer of styrene and ethylenebutylene; and (3) at least 30 percent by weight of non-liquid polyisobutylene, e.g. having a molecular weight of at least 800,000, or a copolymer containing at least 95% by weight of isobutylene; said adhesive composition further containing at least one tackifying resin in an amount sufficient to provide the desired balance of adhesive properties, e.g. tack; and adhesive tapes including same.

6 Claims, No Drawings

NOVEL ADHESIVES

BACKGROUND OF THE INVENTION

The present invention is directed to novel adhesive compositions which may be characterized as possessing resistance to degradative environmental forces such as ultraviolet light (UV) and oxidation, are tacky to the feel, i.e. possess "perceived tack", have good shear resistance, are cost-efficient and can be processed into adhesive tapes by calendering as well as by other per se known coating means, e.g. solvent casting or extrusion coating.

Various adhesive compositions are known which possess some but not all of the above characteristics.

For example, so-called S-I-S adhesives having polystyrene end blocks and an isoprene midblock make excellent adhesives. However, due to the unsaturated isoprene midblock, they are not resistant to UV or oxidation. Accordingly, they are not useful for such applications as storm window tapes where they would be subjected to UV.

On the other hand, polyisobutylene adhesive formulations are essentially saturated and consequently are resistant to UV and oxidation. However, because they have minimal unsaturated hydrocarbon groups, they are not readily modified, e.g. by crosslinking, to provide acceptable shear resistance.

The acrylic aamily of adhesives combines the properties of resistance to shear, UV and oxidation. However, they are costly and cannot be made into adhesive tapes by calendering, a particularly efficacious coating means in the tape manufacturing art.

Relatively recently in the adhesive art, much attention has been focused on a class of adhesives designated as S-EB-S which are thermoplastic rubbers having polystyrene end blocks and rubbery ethylene-butylene midblocks. The ethylene-butylene midblocks are regarded in the rubber industry as being saturated due to the presence of minimal unsaturated hydrocarbon groups. Consequently, the S-EB-S elastomers should in theory obviate the above-noted problem of the unsaturated isoprene midblock in S-I-S adhesives and provide an adhesive having the requisite UV and oxygen stability. However, as will be detailed in more particularly hereinafter, they are not tacky and attempts to incorporate the usual tackifiers, i.e. those which are cost-effective and consequently commonly employed in the adhesive art, failed to provide an adhesive which possesses perceived tack or has tack measurable by conventional instrumentation, e.g. the Polyken (trademark of The Kendall Company) probe tack instrument.

Having failed to obtain an S-EB-S adhesive having the requisite tack, Applicants then theorized that what was needed was an elastomeric component having a shorter chain. Based upon this assumption, they then blended the diblock copolymer, polystyrene-poly(ethylene-butylene) (S-EB) with S-EB-S in various amounts ranging from 20–75% S-EB along with equivalent amounts of tackifier. While the resulting composition was slightly better in terms of perceived tack, there was still no measurable tack.

The task of the present invention in essence can be said to be to solve the aforementioned problems and thus provide an adhesive formulation which, as mentioned above, has the requisite stability against UV and oxidation, possesses the desired adhesive properties of acceptable levels of tack and resistance to shear, is cost-efficient and can be applied to a suitable backing material to an adhesive tape by calendering as well as by the other known coating means such as solvent casting or extrusion.

BRIEF DESCRIPTION OF THE INVENTION

In accordance with the present invention, the aforementioned objectives are accomplished by providing an elastomer composition comprising: (1) at least 30 percent of a triblock terpolymer elastomer having polystyrene end blocks and rubbery poly(ethylene-butylene) midblocks; (2) at least 10 percent of a diblock copolymer elastomer of styrene and ethylene-butylene; and (3) at least 30 percent of non-liquid polyisobutylene, e.g. having a molecular weight of at least 800,000, or a copolymer containing at least 95% by weight of isobutylene (all percentages being by weight); the composition further containing (4) at least one tackifying resin in an amount sufficient to provide the desired adhesive properties.

These adhesive formulations may be coated onto any of the per se known backing materials for adhesive tapes by calendering or other coating techniques. By electing the appropriate backing material and tailoring the ratios of ingredients to the particular desired end use, a whole line of adhesive tapes may be provided utilizing the novel adhesive formulations of this invention.

DETAILED DESCRIPTION OF THE INVENTION

As was discussed previously, attempts to blend a standard tackifying resin with the S-EB-S elastomer alone or in combination with the S-EB diblock elastomer failed to provide a rubber mix possessing acceptable tack.

As examples of the conventional tackifying resins so tested, mention may be made of "Piccolyte" S-85; "Foral" 105; "Polypale"; "Staybellite" ester 10; and "Regalrez" 1018 and 1078 (trademarks of Hercules Chemical); "Nirez" M105, 1085, 1100, and M-85; "Statac" B; "Super Statac" 80 and 100 (trademarks of Reichold Chemical); "Escorez" 1315 and 5380 (trademark of Exxon); "Oulutac" 70 (trademark of Oulu); "Super Ester" 18 (trademark of Arakawa); "Zonester" 85; and "Zonarez" B-115 and M-115 (trademarks of Arizona Chemical).

It has been discovered that the desired tack may be achieved along with the aforementioned other requisite properties (stability to UV and oxidation, shear resistance, cost and ability to coat by calendering or other per se known coating techniques) by blending the tackifier with a rubber mix comprising:

(1) at least 30 percent S-EB-S;
(2) at least 10 percent of S-EB; and
(3) at least 30 percent of non-liquid polyisobutylene, as previously described.

By way of illustration, the three-component rubber mix may comprise the following percentages of the three elastomers:

| | |
|---|---|
| S-EB-S | 30–40% |
| S-EB | 10–40% |
| PIB | 30–55% |

A particularly preferred blend comprises a 40-20-4 blend of the respective components.

The tackifiers which may be employed are those which are understood in the art to possess minimal unsaturated hydrocarbon groups and are accordingly characterized as being tackifying resins which are stable against the degradative forces of UV and oxidation. Suitable resins of this functional description will be readily suggested to those skilled in the art. However, by way of illustration, mention may be made of saturated hydrocarbon, beta-terpene, hydrocarbon esters and pinene tackifying resins.

The amount of resin to be incorporated may vary over a wide range in accordance with the described degree or balance of adhesive properties which is contemplated.

With respect to the amounts of various additives which may be incorporated in a rubber mix, it is standard terminology to recite the quantity as "phr", i.e. parts per hundred by weight of the rubber mix. Accordingly, and by way of illustration, useful adhesives in accordance with the practice of this invention have been prepared employing from about 80 to about 150 phr of resin, i.e. from 80–150 parts by weight of resin for each 100 parts by weight of rubber components.

In addition to the tackifying resin, the adhesive mix may contain other reagents performing specific desired functions, e.g. plasticizers, fillers, extenders, colorants such as titanium dioxide or carbon black, etc.

The novel adhesive formulations of this invention may be prepared in per se known manner in the rubber adhesive art and the manner of preparation accordingly per se comprises no part of this invention.

On a laboratory scale, the adhesives described in the illustrative examples of this invention were prepared by mixing the three elastomers and a portion of the tackifier (e.g. on the order of 50 phr of tackifier) on a two-roll rubber mill, and then adding the remaining tackifier and other reagents along with sufficient organic solvent to dissolve to provide an adhesive formulation having sufficient fluidity for coating, e.g. on the order of 70% solids. Suitable organic solvents for this purpose, e.g. toluene, heptane/toluene blend, hexane, etc. will be readily apparent to those skilled in the art.

While this method of preparation is entirely satisfactory on a laboratory scale, it is envisioned that for commercial production runs, the initial premix of elastomers and a portion of the tackifier will be done in an internal mixer such as a Banbury mixer The remaining ingredients may then be incorporated in the resulting mix, e.g. the Banbury mix, in the manner known in the art utilizing such equipment as a twin screw extruder or a two-roll mill A preferred method, however, comprises the use of cavity transfer mixer such as is disclosed in U.S. Pat. No. 4,419,014 in accordance with the procedures described and claimed in U.S. Pat. No. 4,687,794 issued to Huddleston or the copending application of Huddleston Ser. No. 076,454 filed July 22, 1987, now U.S. Pat. No. 4,750,842, a continuation-in-part of Ser. No. 909,527 filed Sept. 19, 1986 and now abandoned The triblock S-EB-S elastomers which may be employed in the pactice of this invention include those of the "Kraton G" series (trademark of Shell Chemical Company) Illustrative examples of these thermoplastic rubbers with their styrene/rubber ratios shown in parenthesis are G-1650 (28/72); G-1651 (33/67); G-1652 (29/71); G-1657 (14/86); and G-4609 (33/67).

Since the S-EB diblock component is not readily commercially available, a particularly useful method of incorporating this component is by utilization of Kraton G (Shell Chemical) which comprises 70% S-EB and 30% S-EB-S. Accordingly, it is to be understood that when employing Kraton G1726, a portion of the triblock S-EB-S will be provided in this manner, with the remainder being incorporated with S-EB-S alone, e.g. one of the aforementioned triblocks of the Kraton G series. To illustrate, a 40/20/40 ratio of S-EB-S, S-EB and PIB may be obtained by admixing the following:

| Kraton G 1652 | 63 gms |
| Kraton G 1726 | 57 gms |
| PIB | 80 gms |

[As will be apparent from the foregoing discussion, the 57 grams of Kraton G 1726 comprises approximately 40 grams of S-EB and 17 grams of S-EB-S. This 17 grams plus the 63 grams of Kraton G 1652 will proVide the 80 grams of S-EB-S.]

The following examples show by way of illustration and not by way of limitation the practice of this invention.

EXAMPLE 1

A rubber premix was prepared by mixing the following proportions by weight of ingredients on a two-roll mill:

| | |
|---|---|
| Kraton G 1652 | 63 |
| Kraton G 1726 | 57 |
| Vistanex L-80 | 80 |
| (trademark of Exxon for a PIB elastomer) | |
| Piccolyte S-85 | 100 |
| (trademark of Hercules for a betaterpene resin) | |
| Titanium Dioxide (white pigment) | 20 |
| | 320 |

The resulting mix contains 62% of the three-elastomer blend, the remaining 38% being the resin (50 phr) and titania (10 phr). Accordingly, 100 grams of this formulation will contain:

| | |
|---|---|
| S-EB-S (Kraton G 1652) | 25.0 gms |
| S-EB (Kraton G 1726) | 12.5 gms |
| PIB (Vistanex) | 25.0 gms |
| Beta-terpene Resin (Piccolyte S-85) | 31.0 gms |
| $TiO_2$ | 6.5 gms |
| | 100.0 gms |

To 100 gms of this mix were added, with mixing, an additional 31.0 gms (50.0 phr) of Piccolyte S-85 resin (making a total of 100.0 phr), 31 gms (50 phr) of "Super Statac" 80 (trademark of Reichhold for a saturated hydrocarbon resin); and 12.5 gms (20 phr) of a plasticizing oil, "Shellflex" 371 (trademark of Shell Chemical) dissolved in sufficient toluene to provide an adhesive formulation having approximately 70% solids content, identified hereinafter as Formula 1.

EXAMPLES 2–15

Example 1 was repeated, varying the resins and their amounts to provide formulations 2–15, respectively, as set forth in Table 1.

EXAMPLES 16–21

Example 1 was repeated, varying the amounts of plasticizer to provide formulations 16–21, respectively, as forth in Table 1.

EXAMPLES 22-26

Example 1 was repeated varying the amounts of the diblock and triblock elastomers to provide formulations 22-26, respectively, as set forth in Table 1.

TABLE 1

|    | S-EB-S[1] Elastomer (%) | S-EB[2] Elastomer (%) | PIB[3] Elastomer (%) | S-85[4] Resin (phr) | SS 80[5] Resin (phr) | Z 85[6] Resin (phr) | SE 10[7] Resin (phr) | Shellflex 371 Plasticizer (phr) | TiO$_2$ Pigment (phr) |
|----|----|----|----|-----|----|----|----|----|----|
| 1  | 40 | 20 | 40 | 100 | 50 |    |    | 20 | 10 |
| 2  | 40 | 20 | 40 | 83  | 42 |    |    | 20 | 10 |
| 3  | 40 | 20 | 40 | 67  | 20 |    |    | 20 | 10 |
| 4  | 40 | 20 | 40 | 125 |    |    |    | 20 | 10 |
| 5  | 40 | 20 | 40 | 100 |    |    |    | 20 | 10 |
| 6  | 40 | 20 | 40 | 50  |    |    | 50 | 20 | 10 |
| 7  | 40 | 20 | 40 | 50  |    | 50 |    | 21 | 10 |
| 8  | 40 | 20 | 40 | 85  | 40 |    |    | 20 | 10 |
| 9  | 40 | 20 | 40 | 54  | 26 |    |    | 20 | 10 |
| 10 | 40 | 20 | 40 | 68  | 32 |    |    | 20 | 10 |
| 11 | 40 | 20 | 40 | 75  | 35 |    |    | 20 | 10 |
| 12 | 40 | 20 | 40 | 72  | 38 |    |    | 20 | 10 |
| 13 | 40 | 20 | 40 | 95  | 45 |    |    | 20 | 10 |
| 14 | 40 | 20 | 40 | 102 | 48 |    |    | 20 | 10 |
| 15 | 40 | 20 | 40 | 61  | 29 |    |    | 20 | 10 |
| 16 | 40 | 20 | 40 | 85  | 40 |    |    | 5  | 10 |
| 17 | 40 | 20 | 40 | 85  | 40 |    |    | 10 | 10 |
| 18 | 40 | 20 | 40 | 85  | 40 |    |    | 15 | 10 |
| 19 | 40 | 20 | 40 | 85  | 40 |    |    | 20 | 10 |
| 20 | 40 | 20 | 40 | 85  | 40 |    |    | 25 | 10 |
| 21 | 40 | 20 | 40 | 85  | 40 |    |    | 30 | 10 |
| 22 | 30 | 30 | 40 | 85  | 40 |    |    | 20 | 20 |
| 23 | 35 | 25 | 40 | 85  | 40 |    |    | 20 | 20 |
| 24 | 40 | 20 | 40 | 85  | 40 |    |    | 20 | 20 |
| 25 | 45 | 15 | 40 | 85  | 40 |    |    | 20 | 20 |
| 26 | 50 | 10 | 40 | 85  | 40 |    |    | 20 | 20 |

[1]Kraton G 1652 & Kraton G 1726
[2]Kraton G 1726
[3]Vistanex L-80
[4]Piccolyte S-85
[5]Super Statac 80
[6]"Zonester" 85 (Arizona)
[7]Staybelite Ester 10 (Hercules)

The adhesive formulations prepared in the foregoing illustrative examples were cast onto a polyethylene backing at a thickness of on the order of 2.0 mils (±0.2) and the resulting adhesive tapes were then subjected to the standard adhesive tests recited in Table 2.

TABLE 2

| Formula | Adhesion Steel oz./inch width | Adhesion/ Polyethylene oz./inch width | Probe Tack gm/cm$^2$ | Hold Power 100° F. hours | Hold P 120° hour |
|----|----|----|-----|---------|-----|
| 1  | 84 |    | 294 | >100 hrs. |     |
| 2  | 52 |    | 297 | "       |     |
| 3  | 44 |    | 417 | "       |     |
| 4  | 60 |    | 292 | "       |     |
| 5  | 56 |    | 367 | "       |     |
| 6  | 48 |    | 542 | "       |     |
| 7  | 47 |    | 497 | "       |     |
| 8  | 49 | 27 | 315 |         | >48 |
| 9  | 40 | 18 | 150 |         | 47  |
| 10 | 39 | 20 | 330 |         | >48 |
| 11 | 48 | 23 | 311 |         | >48 |
| 12 | 46 | 28 | 322 |         | >48 |
| 13 | 66 | 30 | 261 |         | 8.7 |
| 14 | 40 | 22 | 243 |         | 42  |
| 15 | 40 | 17 | 111 |         | >48 |
| 16 | 53 | 9  | 15  |         |     |
| 17 | 48 | 20 | 78  |         | >48 |
| 18 | 40 | 24 | 249 |         | >48 |
| 19 | 42 | 22 | 441 |         | >48 |
| 20 | 23 | 28 | 350 |         | >48 |
| 21 | 26 | 17 | 448 |         | 6   |
| 22 | 42 | 24 | 404 |         | 11  |
| 23 | 58 | 29 | 104 |         | >48 |
| 24 | 44 | 22 | 380 |         | >48 |
| 25 | 54 | 26 | 271 |         | >48 |
| 26 | 48 | 25 | 487 |         | >48 |

Test Methods

Adhesion - 180° Peel - ASTM D-1000, ASTM E-171, PSTC-1, or PSTC Appendage B (7th Edition)
Probe Tack - ASTM E-171, ASTM D-2979
Hold Power 1 square inch with 1 Kilogram weight, ASTM D3654

In addition to the above adhesive tests, the novel adhesive compositions of this invention were subjected to UV and oxidation stability testing by subjecting them to four months direct contact to summer sunshine, facing the sky at a 45° angle to the ground, southern exposure. No visual degradation was observed and the adhesive was functional, peeled cleanly and was tacky. As distinguished therefrom, the prior rubber-based adhesives, when subjected to the same test conditions will, as a class lose their adhesive properties and become a "gooey" mess within 72 hours.

Since certain changes may be made without departing from the scope of the invention herein described, it is intended that all matter contained in the foregoing description, including the examples, shall be taken as illustrative and not in a limiting sense.

What is claimed is:

1. An adhesive tape characterized as possessing resistance to degradative environmental forces of ultraviolet light and oxidation, as being tacky to the feel, as having good shear resistance, and as being cost-effective, said tape comprising a support carrying on one or both surfaces thereof a layer of adhesive including an elastomer composition comprising:

(1) at least 30 percent by weight of a triblock terpolymer elastomer having polystrene end blocks and rubbery poly(ethelyene-butylene) midblocks;

(2) at least 10 percent by weight of a diblock copolymer elastomer of styrene and ethylene-butylene; and (3) at least 30 percent by weight of a non-liquid polyisobutylene or a copolymer containing at least 95 percent by weight of isobutylene; said adhesive composition further including about 80 to about 150 parts by weight of resin for each 100 parts by weight of rubber components of at least one tackifying resin possessing minimal unstaturated hydrocarbon groups, said resin being selected from the group consisting of saturated hydrocarbon, beta-terpene, hydrocarbon ester and pinene tackifying resins.

2. An adhesive tape as defined in claim 1 wherein the tackifying resin content in said adhesive layer is from about 80 to about 150 parts per hundred rubber.

3. An adhesive tape as defined in claim 2 wherein said triblock terpolymer elastomer contains a styrene/ethylene-butylene ratio of from 14/86 to 33/67.

4. An adhesive tape as defined in claim 1 wherein said elastomer composition consists essentially of from about 30 to about 40 percent by weight of said triblock terpolymer; from about 10 to about 40 percent by weight of said diblock copolymer; and from about 30 to about 55 percent of said isobutylene polymer.

5. An adhesive tape as defined in claim 4 wherein said support layer comprises polyethylene.

6. A method of preparing an adhesive tape comprising the step of calendering onto a support layer an adhesive composition as defined in claim 1.

* * * * *